United States Patent
Zwaal (10) Patent No.: US 9,876,858 B2
(45) Date of Patent: Jan. 23, 2018

(54) SYSTEM, DEVICE AND METHOD FOR CONFIGURING A CONNECTION IN A MACHINE TO MACHINE ENVIRONMENT

(75) Inventor: Frederik Hugo Zwaal, Breda (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 399 days.

(21) Appl. No.: 14/400,178

(22) PCT Filed: May 16, 2012

(86) PCT No.: PCT/EP2012/059197
§ 371 (c)(1),
(2), (4) Date: Nov. 13, 2014

(87) PCT Pub. No.: WO2013/170898
PCT Pub. Date: Nov. 21, 2013

(65) Prior Publication Data
US 2015/0127835 A1 May 7, 2015

(51) Int. Cl.
*H04L 29/08* (2006.01)
*H04W 4/00* (2009.01)

(52) U.S. Cl.
CPC ........... *H04L 67/142* (2013.01); *H04W 4/005* (2013.01)

(58) Field of Classification Search
CPC .............................. H04L 67/142; H04W 4/005
See application file for complete search history.

(56) References Cited

U.S. PATENT DOCUMENTS

2011/0252050 A1* 10/2011 Palleti ............... G06F 17/30876
707/769
2013/0117120 A1* 5/2013 Shafiee ................ H04N 21/812
705/14.58

FOREIGN PATENT DOCUMENTS

WO 2011112683 A1 9/2011

OTHER PUBLICATIONS

ETSI, "Machine-to-Machine Communications (M2M); Functional Architecture", ETSI TS 102 690 V2.0.4; Technical Specification; Apr. 25, 2012. pp. 1-291.

* cited by examiner

*Primary Examiner* — Kim T Nguyen
(74) *Attorney, Agent, or Firm* — Murphy, Bilak & Homiller, PLLC (57) ABSTRACT

The invention relates to a method for configuring a connection between a second device (110) and a first device (130). The first device (130) requests (302) a broker system (140) by providing a unique IDentifier identifying the First device (130), ID-F, to supply a Uniform Resource Locator associated with the First device (130), URL-F, wherein URL-F points to a resource at a data storage device (120). The second device (110) detects (402) from a computer readable medium (840) associated with the first device (130), the ID-F of the first device (130), and requests (403) the broker system (140) by providing the detected ID-F and a unique IDentifier identifying the Second device (110), ID-S, to add (406) a resource for the second device (110) at the data storage device (120), the second resource having a Uniform Resource Locator URL-S, and to supply (411) the URL-S to the second device (110).

15 Claims, 4 Drawing Sheets

SYSTEM, DEVICE AND METHOD FOR CONFIGURING A CONNECTION IN A MACHINE TO MACHINE ENVIRONMENT

TECHNICAL FIELD

The invention relates to the field of network technologies, and in particular, to a method, a system, and a device for configuring a connection, more particular a machine-to-machine connection.

BACKGROUND

With communication becoming ubiquitous, more and more devices will become 'connected' and start to communicate. This is often referred to as machine to machine, M2M, communication, because the devices communicate autonomous, partly or completely without any human interaction involved. In summary, the main purpose of M2M is to provide a simple way to establish a connection between a system, a remote device, and an individual person for data of devices. The connection between two devices may be a wired connection, a wireless connection or a combination of wired and wireless connection. Moreover, an M2M technology integrates data collection, remote monitoring, communication, and information technology, in order to enable more and more devices to have communication and networking capabilities, so that everything can be realized on a network.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), Long Term Evolution Advanced (LTE-Advanced), and/or other technologies such as WiMAX (Worldwide Interoperability for Microwave Access) or those developed by the Institute for Institute of Electrical and Electronics Engineers (IEEE) and 3GPP2.

Within ETSI (European Telecommunication Standards Institute) a standard is being defined for machine to machine communication between devices. The standard focuses mainly on enabling offline communication between the devices. Basically this means that two devices can exchange information without being online at the same time. This kind of communication uses a NSCL (Network Service Capabilities Layer) or GSCL (Gateway Service Capabilities Layer). The NSCL or GSCL can be regarded as a data storage provider or system which performs a mediator function between source devices that generate data for destination devices. To illustrate a very basic use of this mediator function of the data storage provider or system, a simple example shall be described here. An application on a source device that is not always connected wants to send some data to another application on a destination device in the network by means of the data storage provider or system. The data storage provider or system functions much like a database, with resources being identified by a Uniform Resource Locator (URL). The source device would write data to a resource at the data storage provider or system and the destination device would read that resource. If configured accordingly, the destination device could also be notified by the data storage provider upon the writing of the resource by the source device, in order to facilitate synchronization between the source device and the destination device.

The ETSI M2M standard TS 102 690 V1.1.1 (2011-10) defines how resources can be defined and accessed. It details how a source device writes data identified by a URL and a destination device reads the data. The concept relies on both devices using the same URL which uniquely identifies a resource at the data storage provider.

The standard assumes that both devices know what URL to use. In practice, this means that the URL must either be hardcoded into the devices, or be configured manually, by the manufacturer or the user. However, in many cases hardcoding of manufacturer configuration is not possible, because it is not known beforehand which devices must communicate.

At least two problems have been identified with configuration:

Many M2M devices have limited or no input and output possibilities, making manual configuration tedious and error-prone.

Configuring a device is a rather technical endeavour that is deemed complex for the average user.

As an example, consider a scenario where a house with one or more occupants has a boiler that can turn itself off if it detects that no one of the occupants is at home. This detection is based on an app in each of the occupants' mobile phone that knows (=has learned, or is instructed) which mobile network cells or cell-sectors are in the vicinity of the house. In other words, the app in the mobile phone knows whether an occupant is in the vicinity of the house. The app stores this information in a resource assigned to the app of an occupant at a data storage provider. The boiler could use this information from the apps on the mobile phones of the one or more occupants stored at the data storage provider, to decide whether any of the occupants is at home and turn itself on or off in response to the decision.

The problem of the example above is how to connect the mobile phone apps (source devices) to a particular boiler (destination device). An obstacle lies in the boiler, which typically has no display and none or only a few buttons. Configuring a URL in such a device for each occupant it needs to track is a tedious task that is regarded complex for most users. Inputting a URL in the mobile phone app is easier, but still error-prone and complicated for average users.

Another disadvantage of current M2M home automation systems is that the supplier of the system is also the provider of the data storage device providing the resource. The supplier may have access to the private data of the users and could extract valuable data from said private data. With the boiler example, the supplier could know when the users are at home. This can be an undesirable consequence for some users. However, when the data storage provider is unknown before the boiler is made operational for a user, the URL cannot be set when the boiler is manufactured. Consequently, a user has to configure the URL, giving the problems described before.

SUMMARY

It is an object of the invention to provide an improved network system, method and device for configuring an M2M connection, and to obviate at least one of the disadvantageous, described above.

According to a first aspect of the invention, there is provided a method for configuring a connection between a first device and a second device. The first device requests a broker system, by providing a unique IDentifier identifying the first (destination) device, ID-F, to supply a Uniform Resource Locator associated with the first (destination) device, URL-F. The broker system is a broker service implemented by a server. The URL-F points to a first resource at a data storage device. The second (source) device detects from a computer readable medium associated with the first device the ID-F of the first device, and requests the broker system by providing the detected ID-F and a unique IDentifier identifying the second (source) device, ID-S, to add a second resource for the second device at the data storage device. The second resource has a Uniform Resource Locator URL-S. The URL-S is supplied to the second device. The URL-S has a relationship with the first resource having the Uniform Resource Locator URL-F. In an embodiment, the computer readable medium is a QR-code which is accompanied with the first device.

The method is based on the concept that a first device, with limited or no input and output possibilities, for example a boiler, is provided with identity information for connecting to the device. The information is stored in a computer readable medium which is delivered together with the first device to a user, for example a QR-code in the form of sticker on the boiler or QR-code in the manual of the boiler. The computer readable medium comprises a unique identification of the device, as well as the address of the broker system. The broker system is provided by the manufacturer of the first device and comprises in its database for each first device the unique identification and the address of an associated data storage device. Any user that wants to connect to the first device scans the computer readable medium using an app on a mobile or fixed device, i.e. the second device. The app derives information from the computer readable medium, which provides the necessary information for the app to configure a connection with the first device and supplies the information to the broker system. The user thus needs no longer to be aware of any URLs to configure a connection. The broker system is only used for connecting and disconnecting two devices. After two devices have been connected, all communication goes solely through the data storage device.

In a further embodiment of the method, the broker system receives a request comprising first data identifying the first device and second data identifying another data storage device. The broker system updates in its database the data storage device associated with the first device in accordance with the request. This embodiment provides a user full freedom in choosing which data storage device is going to be used for connecting to the first device. The data storage device can be any Network Service Capability Layer, NSCL, from any provider without any limitation. It might even be possible that the user deploys his/her own or local server with Service Capability Layer functionality, for example a Gateway Service Capabilities Layer, GSCL, or Device Service Capabilities Layer, DSCL.

According to a second aspect, there is provided a method in a server for configuring a connection between a first device and a second device. The server receives a request from the first device. The request comprises a unique ID, ID-F, identifying the first device. The server looks up in a database of the server a Uniform Resource Locator of a Data Storage device, URL-DS, associated with the first device and generates with URL-DS, a Universal Resource Locator URL-F pointing to a first resource at a data storage device and supplies the URL-F to the first device. In response to the request, the server adds the first resource at the data storage device being addressable by URL-F. By means of this method running on a server, a first device, which could be a device with limited or no input and output possibilities, connects automatically to the data storage device previously assigned by a user.

A third aspect provides a method in a server for configuring a connection between a first device and a second device. The server receives a request from the second device. The request comprises a unique IDentifier identifying the first device, ID-F, and a unique IDentifier identifying the second device, ID-S. The server looks up in its database a Uniform Resource Locator of a Data Storage device, URL-DS, associated with the first device. URL-DS points to a base address of the data storage device. Furthermore, the server generates a Uniform Resource Locator URL-S, pointing to a second resource at the data storage device for storing data from the second device to be sent to the first device and adds the second resource at the data storage device being addressable by URL-S. The server supplies the URL-S to the second device. By means of this method running on a server, a second device, which has obtained the ID-F of the first device from a computer readable medium, could connect without any further user interaction to the data storage device previously assigned by a user. There is no need for the user to remember the address of the data storage device as it is stored in the database of the broker system.

In an embodiment, the server further receives a request comprising first data identifying the first device and second data identifying another data storage device and updates in a database the data storage device associated with the first device in accordance with the request. The request, which is initiated by a user action, enables a user to change the data storage device used for the communication between first and second device. After this request, the connection between first and second device could be configured by the methods in a server described above. There is no need for the user to input any further Uniform Resource Locator to configure a connection to the first device.

A fourth aspect provides a method in a second device for configuring a connection between a first device and the second device. The second device detects in response to a request a unique IDentifier identifying the first device, ID-F, from a computer readable medium. The second device transmits a request to a broker system by providing the detected ID-F and a unique IDentifier identifying the second device, ID-S, to add a second resource for the second device at a data storage device. The second resource for the second device has a Uniform Resource Locator URL-S. The broker system supplies the URL-S to the second device, which receives the URL-S.

A fifth aspect provides a method in a first device for configuring a connection between the first device and a second device. The first device requests a broker system by providing a unique IDentifier identifying the first device, ID-F, to supply a Uniform Resource Locator associated with the first device, URL-F. URL-F points to a first resource at a data storage device. The first device receives the URL-F from the broker system.

A sixth aspect provides a network system for configuring a connection between a first device and a second device. The network system comprises one or more second devices, a data storage device, a first device, a computer readable medium comprising data associated with the first device and a server performing a broker system, implemented by a server. The second device comprises a processor, an Input/Output device to connect to the network system, a sensor and a data storage comprising instructions, which when executed by the processor, cause the second device to perform the method in a second device according to the fourth aspect. The first device comprises a processor, an Input/Output device to connect to the network system and a data storage comprising instructions, which when executed by the processor, cause the first device to perform the method in a first device according to the fifth aspect. The server comprises a processor, an Input/Output device to connect to the network system, a database and a data storage comprising instructions, which when executed by the processor, cause the server to perform the method in a server according to the third aspect.

A seventh aspect provides a server comprising a processor, an Input/Output device to connect to the network system, a database and a data storage comprising instructions, which when executed by the processor, cause the server to perform the method in a server according to the third aspect.

An eight aspect provides a first device comprising a processor, an Input/Output device to connect to the network system, and a data storage comprising instructions, which when executed by the processor, cause the first device to perform the method according to the fifth aspect.

A ninth aspect provides a second device comprising a processor, an Input/Output device to connect to the network system, a sensor and a data storage comprising instructions, which when executed by the processor, cause the second device to perform the method according to the fourth aspect.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DETAILED DESCRIPTION

Figure 1:
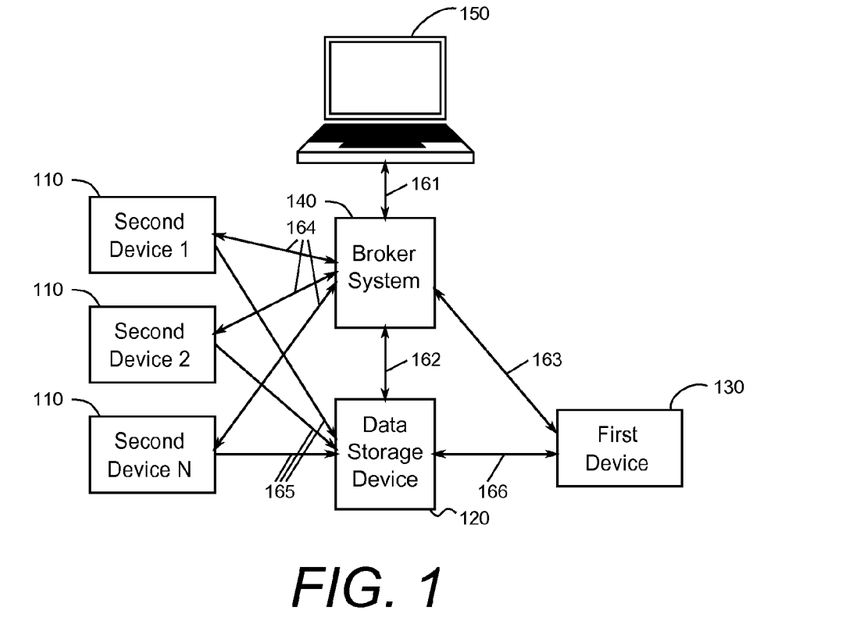
FIG. 1 is a block diagram showing schematically a network system for configuring a machine to machine connection.

FIG. 1 shows schematically a network system for configuring a machine-to-machine connection. The network system in FIG. 1 comprises a plurality of second devices 110, which are source devices, a first server, referred to as a data storage device 120, a first device 130, which is a destination device, a second server, referred to as a broker system 140 and a user input device 150. Each of the arrows 161, 162, 163, 164, 165 and 166 illustrate a network connection between the respective components of the network system. In principle any network technology could be used to provide the connections 161-166 between the components of the network system. In the present description, a second device 110 generates data that has to be sent over a connection to a first device 130. A first device 130 receives the data supplied by the second device 110. To enable offline communication between the second device 110 and first device 130 a data storage device 120 is provided in the network system. The data storage device 120 provides resources to store data from a second device 110, which resource could be read by the first device 130. Acronyms used in the ETSI M2M-standard for second device 110, first device 130 and data storage device 120 are DA (Device Application), NA (Network Application) and NSCL (Network Service Capabilities Layer) respectively. The communication over the network could be via cables, wireless or a combination of cables and wireless.

The network system further comprises a broker system 140. The broker system is a network server on which a brokering service application is running. The broker system provides the following services:
1) it provides the means to register the data storage device 120 to use;
2) It provides the means for the first device 130 to obtain the URLs of the second devices 110;
3) It provides the means for the second devices to obtain the URL at which to write.

These listed services above are described in more detail hereafter. The broker system 140 comprises a database of first devices; wherein for each first device a link between a unique Identifier of a First device, ID-F, and network address of a data storage device, URL-DS, associated with said first device is stored in the database. Initially, a data storage device of the manufacturer or provider of the first devices could be associated with each of the first devices.

As the brokering service is provided by the manufacturer of a first device 130, i.e. a device with limited input/output facilities such as a boiler, the address of the broker system 140 in the network is known before manufacturing the first device. The address could be in the form of a Unique Resource Location URL. At manufacturing the address of the broker system 140 is stored in a data storage of the first device 130 which enables the first device 130 to connect to the broker system 140 to obtain information to configure a connection with a second device. Furthermore, the address of the broker system 140 is stored in computer readable medium, for example a QR-code. The computer readable medium is provided with the first device 130, such that the computer readable medium can be read by an external device, for example a camera of a mobile phone. The computer readable medium could be an adhesive label being part of a manual or being affixed to the first device 130. Together with the address of the broker system 140, data uniquely identifying the first device is stored in the computer readable medium. How the data in the computer readable medium is used to configure a connection will be described with reference to examples hereafter.

The network system further comprises a user input device 150. By means of the user input device, a user can communicate over a network connection 161 with the broker system 140. For example, by means of a web interface, a user can change the network address of the data storage device linked to a first device. In that case a web browser running on computer, which may be a mobile phone or PC, could be used to access the web interface.

As an exemplary example, consider a scenario where a user has a boiler, the first device, in his home that can turn itself off as soon the boiler detects that no one is at home and that can turn itself on when the boiler detects that a user is coming home. The data to decide that a user is at home or away is generated by an app running at the user's mobile phone, the second device. The signals from the base stations of the cellular mobile network could be used to determine the location of the mobile phone. From these signals, the app could learn which mobile network cells are in the vicinity of the user's house and generate data indicating if the user of the mobile phone is at home, i.e. in the vicinity of his house, or not. It should be noted that a GPS or any other position determining method could be used to determine the state of the user by the app in the mobile phone. At least when there is a change in state, the new status information is communicated to the boiler via the data storage device. The app in the mobile phone sends the status information to a second resource at the data storage device. The data storage device could inform the boiler that the second resource has changed or the boiler could regularly poll if there is a change in a second resource for the boiler at the data storage device. In this way multiple users could send their status information to the data storage device in their respective second resources and the boiler, i.e. the first device, could read the status information from the multiple users from said second resources and decide whether anyone is at home.

The network system described above allows users to assign in the network any suitable data storage device for use in a M2M connection. For example, it could be the NSCL of the manufacturer, the NSCL of the user's service provider, the GSCL (Gateway Service Capabilities Layer) and even the network server of the user's own network system at home. After the user has assigned a data storage device to a particular first device and has linked the address of the data storage device to said particular first device in the database of the broker system, the first device could autonomously obtain the URL of its resources where it must be reading from. The resources are located at the assigned data storage device. By reading the computer readable medium attached to the first device, the second device(s) could obtain the necessary information to configure a M2M connection to said first device. After a data storage device is assigned to the boiler of the user, no other action is needed from said user or other people living in the house to configure the M2M connection than instructing their mobile phone to read the QR-code attached to the boiler. The only address or URL that a user has to input is the address or URL of the data storage device. This has to be done once and could be done with use of a user input device, such as a keyboard, mouse, touchscreen, and a web interface. This makes it very easy for the user to setup and disconnect connections between the first and second devices. There is no need to type in long URL's after the address of the data storage device is stored in the database of the broker system.

Figure 2:
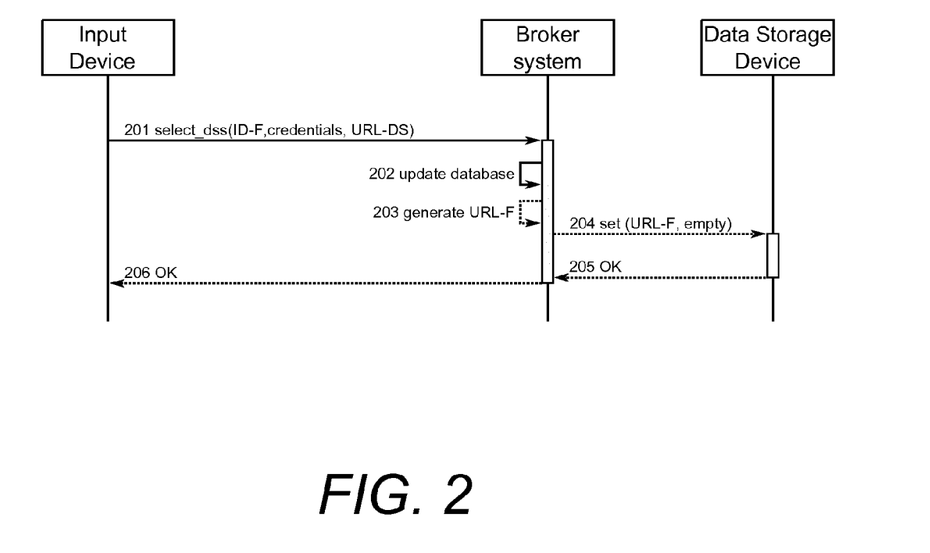
FIG. 2 is a signalling diagram, illustrating an example of the communication to configure the data storage device to use.

FIG. 2 shows a signalling or sequence diagram illustrating an example of the communication to configure the data storage device to use. By means of an input device a user connects to the broker system (140) and provisions the address of the data storage device (120) the user wants to use. The address could be the base URL of a data storage device, implemented on a server. The data storage device could be a NSCL, GSCL or DSCL as described in ETSI TS 102 690 Machine-to-Machine communications (M2M); Functional architecture. The broker system (140) comprises a database which comprises for each first device the address of the associated data storage device (120).

Connecting to the broker system could be done through a webserver, where the user needs to fill in some fields, among which the URL, URL-DS, of the data storage device and the unique identifier, ID-F, of the first device. If necessary, the configuration can be made secure using credentials, e.g. password and PIN code, which are provided with the device, e.g. in the device's documentation. Any device on which a web browser is running could be used as input device to provide the broker system with the necessary information. Instead of a web based communication with a web browser, an app running on a mobile could be used by a user to achieve the same goal.

Action 201 illustrates the transmission of a user request comprising first data, ID-F, IDentifying a First device and second data, URL-DS, identifying the Data Storage device that has to be assigned to the first device. Optionally, the user has to provide credentials, for example a password and a PIN code, to make the configuration secure. In action 202, the broker system updates in a database the base URL of the data storage device associated with the first device identified with ID-F. In action 203, the broker system generates a uniform resource locator URL-F for the first device. URL-F points to a first resource at the data storage device that will be used by the first device to receive data. In action 204, a request is sent to the data storage device to add the first resource accessible by URL-F and/or to clear its content. In action 205, the data storage device sends a message to the broker system that the request is executed successfully. In action 206, the broker system sends a message to the user of the input device that the user request to change the data storage device assigned to a first device has been executed successfully. It should be noted that the actions 203-205 do not need to be performed in response to the user request in action 201. These actions could also be performed after the first device requests the broker system to supply the address, URL-F, of its first resource at the data storage device assigned to said first device in the database of the broker system.

Figure 3:
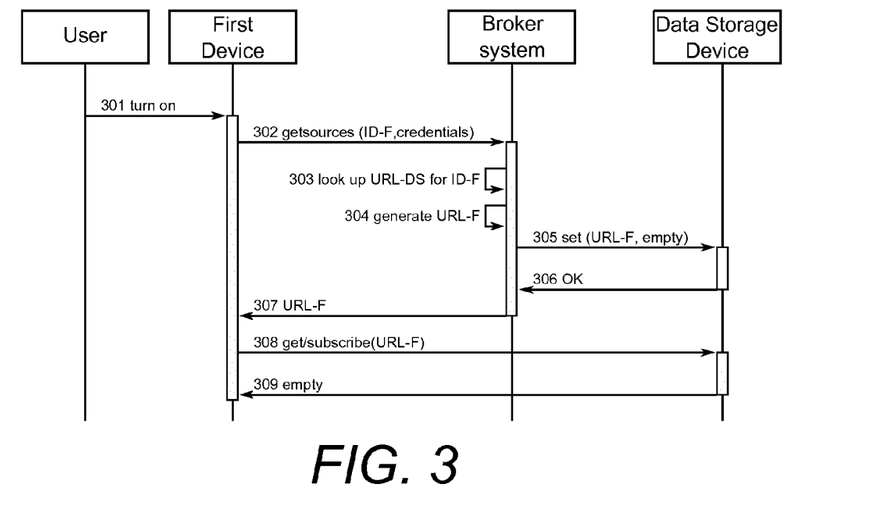
FIG. 3 is a signalling diagram, illustrating an example of the communication to configure the first device.

FIG. 3 shows a signalling diagram illustrating an example of the communication to configure the first device. When the first device is turned on, it must discover where to get its input from. The first device connects to the broker system and fetches the URL-F. The URL-F points to a location which comprises a data structure of URLs pointing to second resources at the data storage device where corresponding second devices which are connected to the first device store their data to be used by the first device. Some examples of a data structure of URLs are: a table, a list, a sequence, sub-resources. If needed, the first device could subscribe to changes to any of the resources. Subscription is done in a way commonly known to the skilled person.

Action 301, a user turns on the first device. The start-up triggers the first device to request in action 302 the broker system by providing a unique ID, ID-F, identifying the first device to supply a Uniform Resource Locator, URL-F, associated with the first device. URL-F points to a first resource at the data storage device. If needed action 302 can be secured with credentials embedded in the first device. In action 303, the broker device looks up in a database of the broker system the Uniform Resource Locator, URL-DS of the data storage device associated with the first device having unique identifier ID-F. URL-DS points to the base address of the data storage device. Subsequently, in action 304, the broker system generates uniform resource locator URL-F, pointing to the first resource at the data storage device. In an embodiment, the first resource is configured to comprise a list of URLs pointing to second resources at the data storage device which are configured for receiving data from associated second devices and supplying the data to the first device. In action 305, the broker system request the data storage device to add a first resource being addressable by URL-F and to clear the content, i.e. empty the first resource. In action 306, the data storage device confirms that the request has been performed successfully. In action 307, the broker system supplies the URL-F to the first device. In response to the receipt of the URL-F, in action 308, the first device request the data storage device to supply the content of URL-F, is request get(URL-F). In response to said request, in action 309, the data storage device transmits a message that the first resource is empty. Action 308 could also be a request to subscribe to first resource being addressable by URL-F. This is request subscribe(URL-F). In response to said request, the data storage device transmits a message that the first resource is empty. Subsequently, the data storage device will send automatically a message to the first device when the content of the first resource has changed. It should be noted that actions 304-306 correspond to actions 203-205 respectively in FIG. 2. Depending on the implementation, the first resource URL-F is added when assigning the data storage device to the first device as shown in FIG. 2 by action 204 and 205 or when the first device request the broker system to supply URL-F.

Figure 4:
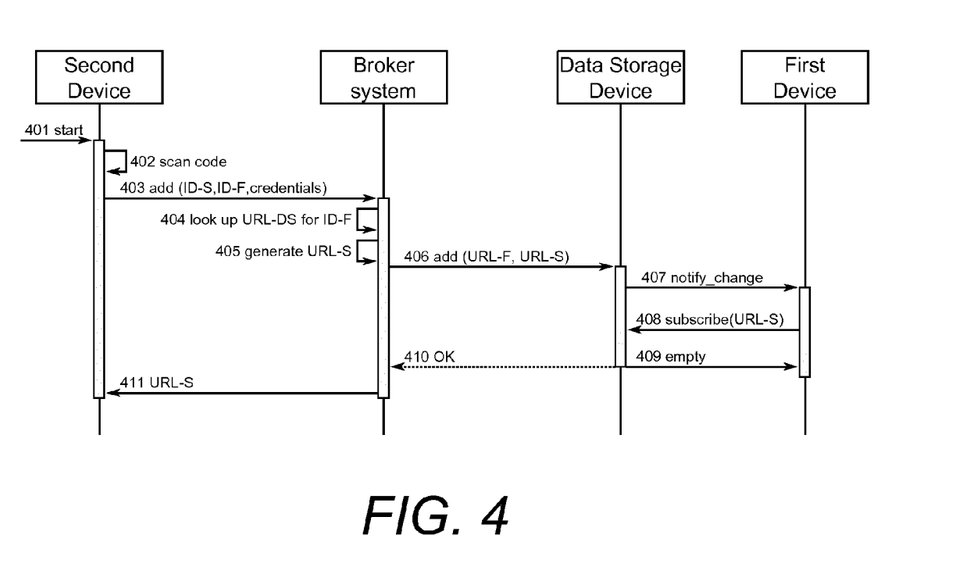
FIG. 4 is a signalling diagram, illustrating an example of the communication to configure the second device.

FIG. 4 shows a signalling diagram illustrating an example of the communication to configure the second device. When a second device wants to connect to a first device, the second device must discover where to write its output to. In an embodiment, the second device is a mobile device with a camera. The mobile device uses its camera to scan a QR code associated with the first device. The QR code provides the identification of the first device and optionally the address of the corresponding broker system. In case the app of the second device is dedicated to a specific service provider, the app could comprise the address of the broker system. However, if the app could be used to connect to a multitude of broker systems, the QR code should provide the address of the broker system.

After reading the QR-code, the second device connects to the broker system and indicates that it wants to connect to the first device obtained from the QR code. The broker system generates a new URL, URL-S, and transmits the URL-S to the second device. URL-S points to a second resource at the data storage device where the second device can write its data for the first device.

In action 401, the user triggers an app on its mobile phone, i.e. the second device, to configure a connection with a first device. In response to that, in action 402, the second device detects from a computer readable medium, a unique ID, ID-F, identifying the first device and optionally the address of the broker system. The computer readable medium could be a QR code as described above. Subsequently, in action 403, the second device requests the broker system to add the second device to the second devices that would like to communicate with the first device and to supply the uniform resource locator, URL-S, pointing to the second resource where the second device should write its data. In action 404, the broker system looks up the address URL-DS of the data storage device associated with the ID-F retrieved from the computer readable medium. The URL-DS is in action 405 used to generate URL-S. Action 404 is also used to obtain URL-F pointing to the first resource at the data storage device which comprises a data structure with all URL-Ses assigned to second devices having a connection with the first device. In action 406, the broker system requests the data storage device to adapt the first resource having Uniform Resource Locator URL-F to comprise URL-S and to add a second resource accessible by URL-S. When the first device has subscribed to URL-F, the data storage device will notify the first device about the change in the first resource associated with URL-F and the first device will retrieve the content of the first resource. This is action 407. The first device will recognize that URL-S is added and in response to that, in action 408, the first device subscribes to the second resource associated with URL-S and retrieves in action 409 the content of the second resource URL-S. In action 410, the data storage device informs the broker system that the second resource URL-S is successfully created and in action 411 the broker system transmits URL-S to the second device. From now on, the second device is able to transmit data to the first device.

The first device typically subscribes to its list of URLs, URL-Ses to second resources of second devices connected to the first device and stored in the data structure of the first resource URL-F, so that it receives a notification whenever a second device is added or removed, i.e. connects or disconnects with the first device. In addition, the first device could subscribe to each of the URLs, URL-S, in the first resource URL-F. In this way, the first device receives a notification whenever one of its second resources has changed.

Figure 5:
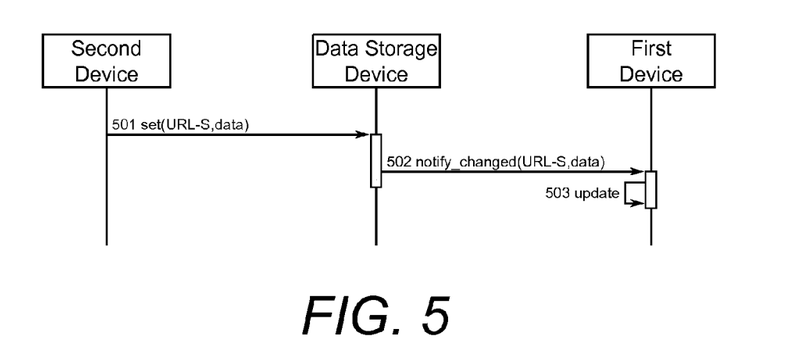
FIG. 5 is a signalling diagram, illustrating an example of M2M communication.

FIG. 5 shows a signalling diagram illustrating a typical communication. In action 501, the second device sends its data for the first device to the second resource addressable by URL-S at the data storage device. In response to that, assuming that the first device has subscribed to URL-S, the data storage device notifies the first device of the change and sends the content of the second resource to the first device. In response to the data received, in action 503, the first device performs an update action.

It should be noted that it is not necessary for the first device to use subscriptions. The first device could also use polling on the relevant resources, for instance because it is behind a firewall and cannot receive notifications or because it is not always online. Whether the first device uses subscriptions or polling makes no distinction to the invention.

Figure 6:
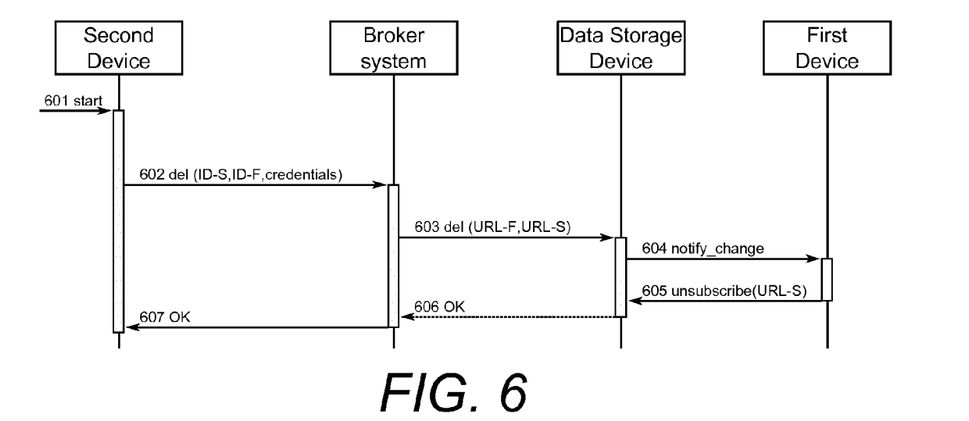
FIG. 6 is a signalling diagram, illustrating an example of the communication to remove a second device from the network.

FIG. 6 shows a signalling diagram illustrating an example of the communication to remove a second device from the network. When a second device no longer wants to be connected to a first device, it indicates so to the brokering system. The broker system simply removes the URL-S of said second device from the list of second devices connected to the first device stored in the data structure of first resource URL-F of said first device. In action 601, a user starts the disconnection process. In response to that, in action 602, the second device requests the broker system to remove the second device from the list of second devices that communicate with the first device. In action 603, the broker system instructs the data storage device to remove URL-S from the first resource at URL-F and to release second resource at URL-S from the data storage device. In action 604, the first device is notified about the change of first resource URL-F. In action 605, which is performed when the first device has subscribed to second resource URL-S, the first device unsubscribes to URL-S. In action 606, the data storage device informs the broker system that the resource URL-S is successfully removed and in action 607 the broker system informs the second device that the request in action 602 is performed successfully.

Figure 7:
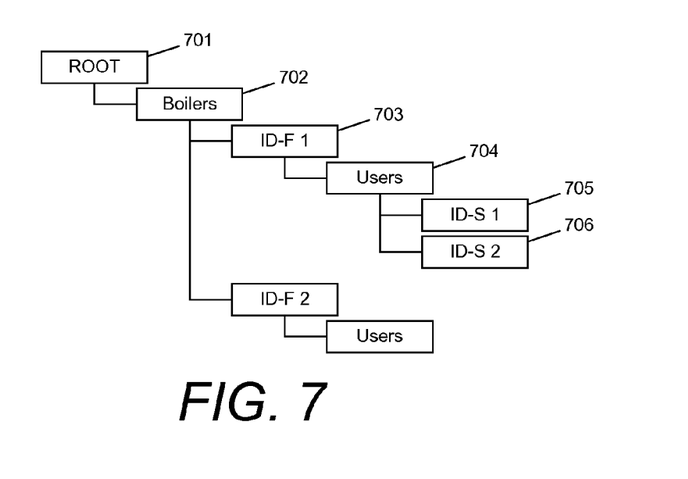
FIG. 7 is an illustration of a data structure of resources on a data storage device.

FIG. 7 shows an example of a data structure of the resources on a data storage device. This data structure is analogous to that of a typical modern file system. The data storage device has a root resource 701. In this root resource for each type of first device a sub-resource 702 is created. In FIG. 7 the type of first device is a boiler. In this sub-resource

702, for each boiler a sub resource 703 is created. Each sub-resource 703 could have a name that corresponds to the unique identification of the first device ID-F. In this directory, there is a sub-resource 704 Users. In this sub-resource, for each second device connected to boiler ID-F 1 there is a file ID-S 1, ID-S 2 having reference signs 705 and 706 respectively. In the description given, URL-S points to a sub-resource "ID-S 1" 705, or "ID-S 2" 706 and URL-F points to a sub-resource "Users" 704. It should be noted that the data structure is exemplary and could be implemented differently with comparable characteristics.

In the description given above, the broker system introduces one level of indirection between the first device and the second device. This indication is realized through an additional resource, first resource, in the data storage device, comprising a data structure in which the URLs of the actual resources URL-S of the second devices connected to the first device are stored. The URL of the additional resource is URL-F. The first device thus uses the data from the additional resource to discover the second resource of the second devices. The broker system ensures that the additional resource is updated properly. When the first device subscribes to the additional resource, i.e. first resource, the first device will be notified about each update. The first device will subsequently determine which URL pointing to a second resource of a second device has been added to or removed from the list of URLs. In this embodiment URL-S has a relationship with the resource having the Uniform Resource Locator URL-F, wherein URL-S is stored in a data structure of the first resource associated with URL-F. In other words, the first resource having the Uniform Resource Locator URL-F comprises a list, a sequence or nested structure of one or more URL-S assigned by the broker system to corresponding second devices. Alternatively, a data structure could be envisioned with a first resource wherein the second resources are sub-resources of the first resource. In this case there is no need to store the URL-Ses in the first resource.

In another embodiment of a data structure of the first and second resources, it is assumed that a predetermined number of second devices could connect to a first device. In this case, URL-F points to a single resource which includes all 'slots' for said predetermined number of second devices. Each slot has its own URL-S and the broker system will ensure that each second device will obtain a different URL-S. A second device could only write in the slot URL-S assigned to it by the broker system. The first device will retrieve each time the single resource, including all slots. In this embodiment URL-S has a relationship with the first resource having the Uniform Resource Locator URL-F, wherein the second resource associated with URL-S is a part of the first resource associated with URL-F.

Figure 8:
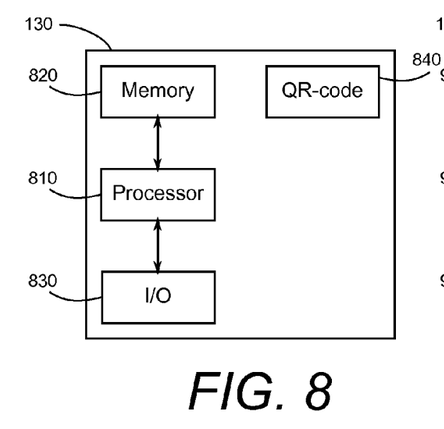
FIG. 8 is a block diagram illustrating a first device.

Referring to FIG. 8, there is illustrated a block diagram of exemplary components of a first device 130. The first device can be any M2M communication device. As illustrated in FIG. 8, the first device 130 comprises a processor 810, a data storage 820 and an Input/Output unit 830. The data storage 820, which could be any suitable memory to store data, comprises instructions that, when executed by the processor 810 cause the device 130 to perform the actions described before. The I/O unit 830 is configured to support at least all communications with the broker system and data storage device. The first device further comprises a computer readable medium in the form of a QR-code, barcode or any other computer readable sequence of characters. The QR-code or barcode includes at least data characterizing the address of the broker system associated with the first device in the network and data uniquely identifying the first device at the broker system. The computer readable medium could also be in the form of a Radio-Frequency IDentification (RFID)-tag, Near Field Communication (NFC)-tag, WIFI-tag, Bluetooth-tag or USB-tag. A USB-tag is a device with a data storage that could be read by means of a USB-interface. In the latter case, the data could be stored in the data storage 820. In principle any detectable identifier could be used as computer readable medium.

Figure 9:
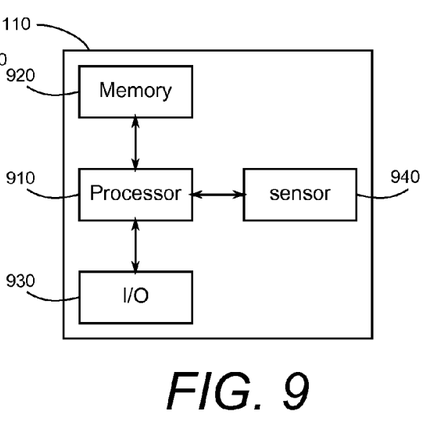
FIG. 9 is a block diagram illustrating a second device.

Referring to FIG. 9, there is illustrated a block diagram of exemplary components of a second device 110. The second device could be any device having capabilities to read an external computer readable medium. As illustrated in FIG. 9, the second device 110 comprises a processor 910, a data storage 920, an Input/Output unit 930 and a sensor 940. The data storage 920 comprises instructions that, when executed by the processor 910 cause the second device 110 to perform the actions in a second device described before. The I/O unit 930 is configured to support all communications with at least the broker system database and data storage device. The sensor 940 can be any device capable to read an external computer readable medium. In case the first device comprises a computer readable medium in the form of a QR-code, the sensor is an image sensor. In case the computer readable medium is in the form of a RFID-tag or NFC-tag, the sensor is a RFID-reader or NFC-sensor, respectively. And in case the computer readable medium is in the form of a USB-tag, the sensor 940 is a USB-port.

Figure 10:
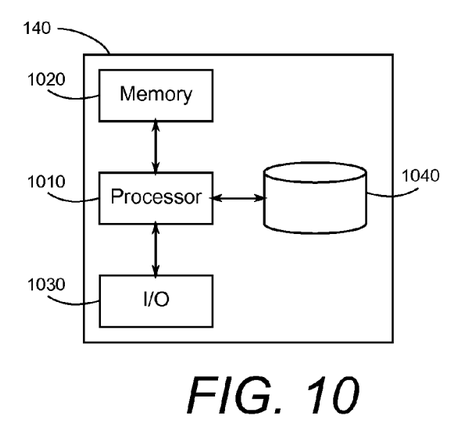
FIG. 10 is a block diagram illustrating a broker system.

Referring to FIG. 10, there is illustrated a block diagram of exemplary components of a broker system 140. The broker system can be any server in the network on which the broker system functionality described above is implemented. As illustrated in FIG. 10, the broker system 140 comprises a processor 1010, a data storage 1020, an Input/Output unit 1030 and a database 1040. The data storage 1020 comprises instructions that, when executed by the processor 1010 cause the broker system 140 to perform the actions in a broker system described before. The I/O unit 1030 is configured to support all communications with at least the first device, second device and data storage device. The database 1040 comprises for each first device a link to the data storage device on which data for the first device should be stored. Optionally, the database could comprise for each first device a list of second devices for which a M2M connection is configured to said first device. This is advantageous when a user would like to change to another data storage device for a particular first device. The broker system is than able to reconfigure the M2M connections without additional user actions needed on the first device and second devices.

In the network system described with reference to FIG. 1, a user input device 150 in the form of a computer is used to provide the broker system 140 with the necessary data to change the address of the data storage device 120 that has to be used for the M2M connection. The user input device 150 could also be the mobile phone on which an application is running which provides the mobile phone second device functionality to communicate via the M2M connection with the first device.

The present invention and its exemplary embodiment can be realized in many ways. For example, one embodiment includes a computer-readable medium or a computer program product having computer readable code stored thereon that are executable by a processor of a second device, first device and/or broker system to cause the second device, first device and/or broker system to perform the method of the exemplary embodiments as previously described.

The invention provides a mechanism through which users can connect two devices without requiring any special skills. They can simply use their camera equipped mobile phone to connect the devices and do not need to know anything about URLs. Moreover, there is no longer any possibility for erroneous input.

In addition, the user has full freedom in choosing which data storage device in the network is going to be used. The user can use an NSCL or GSCL, i.e. data storage device, from any provider, without limitations. Of course, a user can also deploy his own data storage device. In this way, a user can please his private information in an environment the user trusts.

It should be noted that the broker system is only used for connecting and disconnecting two devices. After two devices have been connected, all communication goes solely through the data storage device the user has selected or configured.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the idea of the invention.

The invention claimed is:

1. A method for configuring a connection between a second device and a first device, the method comprising:
the first device requesting a broker system, by providing a unique identifier identifying the first device (ID-F), to supply a Uniform Resource Locator associated with the first device (URL-F), wherein the URL-F points to a first resource at a data storage device; and
the second device detecting, from a computer-readable medium associated with the first device, the ID-F of the first device, and requesting the broker system, by providing the detected ID-F and a unique identifier identifying the second device (ID-S), to add a second resource for the second device at the data storage device, the second resource having a Uniform Resource Locator URL-S, and to supply the URL-S to the second device, wherein the URL-S has a relationship with the second resource having the Uniform Resource Locator URL-F and the computer-readable medium.

2. The method of claim 1, wherein the method further comprises:
receiving, by the broker system, a request comprising first data identifying the first device and second data identifying another data storage device; and
updating, by the broker system, in a database, the data storage device associated with the first device in accordance with the request.

3. The method of claim 1, wherein the computer-readable medium is one selected from a group comprising: a QR-code, a barcode, any other computer-readable sequence of characters, a NFC-tag, a RFID-tag, a Bluetooth-tag, and a WiFi-tag.

4. A method in a server for configuring a connection between a first device and a second device, the method comprising:
receiving a request from the first device, the request comprising a unique ID (ID-F) identifying the first device;
looking up a Uniform Resource Locator associated with the first device (URL-F) using the ID-F, wherein the URL-F points to a first resource at a data storage device, and wherein the first resource is uniquely associated with the first device; and
supplying the URL-F to the first device.

5. The method of claim 4, wherein the method further comprises adding the first resource at the data storage device being addressable by the URL-F.

6. The method of claim 4, wherein the method further comprises:
receiving a request comprising first data identifying the first device and second data identifying another data storage device; and
updating in the database, the data storage device associated with the first device in accordance with the request comprising the first and second data.

7. A method in a server for configuring a connection between a first device and a second device, the method comprising:
receiving a request from the second device, the request comprising a unique identifier identifying a first device (ID-F) and a unique identifier identifying the second device (ID-S);
looking up in a database a Uniform Resource Locator of a Data Storage device (URL-DS) associated with the first device, wherein the URL-DS points to a base address of the data storage device;
generating a Uniform Resource Locator URL-S, pointing to a second resource at the data storage device for storing data from the second device to be sent to the first device;
adding the second resource at the data storage device being addressable by the URL-S; and
supplying the URL-S to the second device.

8. The method of claim 7, wherein the method further comprises the step of adding a first resource having the Uniform Resource Locator URL-F to comprise the URL-S.

9. A method in a second device for configuring a connection between a first device and the second device, the method comprising the steps of:
detecting, in response to a request, a unique identifier identifying the first device (ID-F) from a computer-readable medium;
transmitting a request to a broker system, by providing the detected ID-F and a unique identifier identifying the second device (ID-S), to add a second resource for the second device at a data storage device, the second resource for the second device having a Uniform Resource Locator URL-S, and to supply the URL-S to the second device; and
receiving the URL-S.

10. A method in a first device for configuring a connection between a first device and a second device, the method comprising:
requesting a broker system, by providing a unique identifier identifying the first device (ID-F), to supply a Uniform Resource Locator associated with the first device (URL-F), wherein the URL-F points to a first resource at a data storage device, and wherein the first resource is uniquely associated with the first device; and
receiving the URL-F.

11. A network system for configuring a connection between a first device and a second device, the network system comprising:
one or more second devices, a data storage device, a first device, a computer-readable medium comprising data associated with the first device and a server; wherein the first device comprises a processor, an Input/Output device to connect to the network system and a data storage comprising instructions that, when executed by the processor, cause the first device to:
    request the server, by providing a unique identifier identifying the first device (ID-F), to supply a Uniform Resource Locator associated with the first device (URL-F), wherein the URL-F points to a first resource at the data storage device; and
    receive the URL-F;
the second device comprising a processor, an Input/Output device to connect to the network system, a sensor and a data storage comprising instructions that, when executed by the processor, cause the second device to:
    detect, by means of the sensor, in response to a request, a unique ID (ID-F) identifying the first device from the computer readable medium;
    request the server, by providing the detected ID-F and a unique identifier identifying the second device (ID-S), to add a second resource for the second device at the data storage device, the second resource for the second device having a Uniform Resource Locator URL-S, and to supply the URL-S to the second device; and
    receive the URL-S; and,
the server comprising a processor, an Input/Output device to connect to the network system, a database and a data storage comprising instructions that, when executed by the processor, cause the server to:
    receive a request from the second device, the request comprising a unique identifier identifying a first device (ID-F) and a unique identifier identifying the second device (ID-S);
    generate the Uniform Resource Locator URL-S, pointing to the second resource at the data storage device for storing data from the second device to be sent to the first device;
    add the second resource at the data storage device being addressable by URL-S; and,
    supply the URL-S to the second device.

12. The network system of claim 11, wherein the data storage device is a Network Service Capabilities Layer (NSCL), a Gateway Service Capabilities Layer (GSCL), or a Device Service Capabilities Layer (DSCL), being devices which provide Machine-to-Machine Service Capabilities.

13. A server comprising a processor, an Input/Output device to connect to a network system, a database, and a data storage comprising instructions that, when executed by the processor, cause the server to:
    receive a request from a second device, the request comprising a unique identifier identifying a first device (ID-F) and a unique identifier identifying the second device (ID-S);
    look up, in the database, a Uniform Resource Locator associated with the first device (URL-DS), wherein URL-DS points to an address of a data storage device,
    generate a Uniform Resource Locator URL-S, pointing to a second resource at the data storage device for storing data from the second device to be sent to the first device
    add the resource at the data storage device being addressable by the URL-S;
    adapt a first resource having the Uniform Resource Locator URL-F to comprise the URL-S; and,
    supply the URL-S to the second device.

14. A first device comprising a processor, an Input/Output device to connect to the network system, and a data storage comprising instructions that, when executed by the processor, cause the first device to:
    request a broker system, by providing a unique identification identifying the first device (ID-F), to supply a Uniform Resource Locator associated with the first device (URL-F), wherein the URL-F points to a first resource at a data storage device, and wherein the first resource is uniquely associated with the first device; and
    receive the URL-F,
    wherein the first device further comprises a computer-readable medium carrying the unique identifier identifying the first device ID-F.

15. A second device comprising a processor, an Input/Output device to connect to the network system, a sensor and a data storage comprising instructions that, when executed by the processor, cause the second device to:
    detect, by means of the sensor, in response to a request, a unique identifier identifying a first device (ID-F) from a computer readable medium;
    request a broker system, by providing the detected ID-F and a unique identifier identifying the second device (ID-S), to add a second resource for the second device at a data storage device, the second resource for the second device having a Uniform Resource Locator URL-S, and to supply the URL-S to the second device; and
    receive the URL-S.

* * * * *